United States Patent [19]
Holzschuh

[11] Patent Number: 4,588,365
[45] Date of Patent: May 13, 1986

[54] INJECTION MOLDING ASSEMBLY

[75] Inventor: Johann Holzschuh, Meinerzhagen, Fed. Rep. of Germany

[73] Assignee: Battenfeld Maschinenfabriken GmbH, Fed. Rep. of Germany

[21] Appl. No.: 656,669

[22] Filed: Oct. 1, 1984

[30] Foreign Application Priority Data

Oct. 15, 1983 [DE] Fed. Rep. of Germany ....... 3337546

[51] Int. Cl.$^4$ ............................................. B29C 45/07
[52] U.S. Cl. .................... 425/183; 264/297.2; 264/328.8; 425/185; 425/190
[58] Field of Search ................. 425/190, 462 C, 542, 425/544, 567, 574, 575, 130, 185, 186, 183; 264/297.2, 328.11, 328.8, 245

[56] References Cited

U.S. PATENT DOCUMENTS

| 2,465,656 | 3/1949 | Morin | 264/328.8 |
| 3,464,091 | 9/1969 | Bielfeldt | 425/574 |
| 4,421,469 | 12/1983 | Egger et al. | 425/183 |

FOREIGN PATENT DOCUMENTS

| 69221 | 2/1983 | European Pat. Off. | |
| 1325799 | 3/1963 | France | 425/574 |
| 36143 | 9/1977 | Japan | 425/185 |

Primary Examiner—Jay H. Woo
Assistant Examiner—Timothy W. Heitbrink
Attorney, Agent, or Firm—Louis E. Marn

[57] ABSTRACT

There is disclosed an injection molding assembly comprised of a tool unit and two extruder units each including a drive unit spatially-disposed from one another and mounted for transverse movement with respect to the tool unit. In one embodiment of the present invention, if the extruder units are provided with hydraulic drive units, the extruder unit which is not coupled to the tool unit may be placed in fluid communication via a switching device with a low capacity hydraulic pump.

8 Claims, 2 Drawing Figures

INJECTION MOLDING ASSEMBLY

FIELD OF THE INVENTION

The invention relates to an injection molding assembly, and more particularly to an injection molding assembly for molding thermoplastic materials and the like.

BACKGROUND OF THE INVENTION

Injection molding assemblies for molding thermoplastic materials and the like includes a tool unit and a extruder unit including a feed screw. When changing to another thermoplastic material formulation, it is usually necessary to replace the extruder unit and/or feed screw as a result of different geometry requirements of the extruder unit and/or feed screw for such material. Changing of the extruder unit and/or feed screw is cumbersome and time consuming. Depending upon the thermoplastic material formulation, in many instances it is necessary to clean and dismantle the extruder unit prior to processing another thermoplastic material formulation which further increases down time of the injection molding assembly.

In European Patent Application No. 0 069 221, there is disclosed an injection molding assembly provided with a tool unit and two separate extruder units capable of being alternately coupled to the tool unit. In use, when one extruder unit is operatively connected to the tool unit, and thus coupled to the drive of the injection molding apparatus, as well as connected to supply lines therefor, the second extruder unit is disposed in a storage magazine adjacent to the injection molding apparatus. The second extruder unit may be connected to the supply lines when positioned in the storage magazine, to permit the second extruder unit to be maintained at a predetermined temperature level or may be readily brought to operational temperatures before the second extruder unit is substituted for the first extruder unit. The injection molding assembly of the aforementioned European Patent Application does not permit the cleaning of the extruder unit and/or feed screw, and thus cleaning time of the extruder unit is added to the time required for substitution of a extruder unit.

To substitute or exchange a extruder unit, the drive unit and energy supply couplings of the extruder unit connected to the tool unit are disconnected by special actuating means. Thereafter, the extruder unit being exchanged is removed by a crane assembly of three-dimensional capabilities and placed in an appropriate storage magazine. The crane assembly then picks up the second extruder unit in the storage magazine and positions such second extruder unit in operative relationship to the tool unit of the injection molding apparatus, with the drive unit and energy supply couplings being thereafter connected thereto. The injection molding assembly of such aforementioned European Patent Application requires a lot of space, is costly to manufacture and requires a relatively high amount of down time prior to placing the injection molding apparatus into production.

OBJECTS OF THE INVENTION

It is an object of the present invention to provide an improved injection molding assembly having two extruder units facilitating exchange of one extruder unit for another extruder unit.

Another object of the present invention is to provide an improved injection molding assembly having two readily exchangeable extruder units.

Still another object of the present invention is to provide an improved injection molding assembly having two readily exchangeable extruder units permitting of exchange times of short duration.

Yet another object of the present invention is to provide and improved injection molding assembly having two readily exchangeable extruder units permitting facile exchange therebetween.

A still further object of the present invention is to provide an improved injection molding assembly having two readily exchangeable extruder units of reduced costs of manufacturing.

SUMMARY OF THE INVENTION

These and other objects of the present invention are achieved by an injection molding assembly comprised of a tool unit and two extruder units each including a drive unit spatially-disposed from one another and mounted for transverse movement with respect to the tool unit. In one embodiment of the present invention, if the extruder units are provided with hydraulic drive units, the extruder unit which is not coupled to the tool unit may be placed in fluid communication via a switching device with a low capacity hydraulic pump.

DETAILED DESCRIPTION OF THE DRAWING

Figure 1:
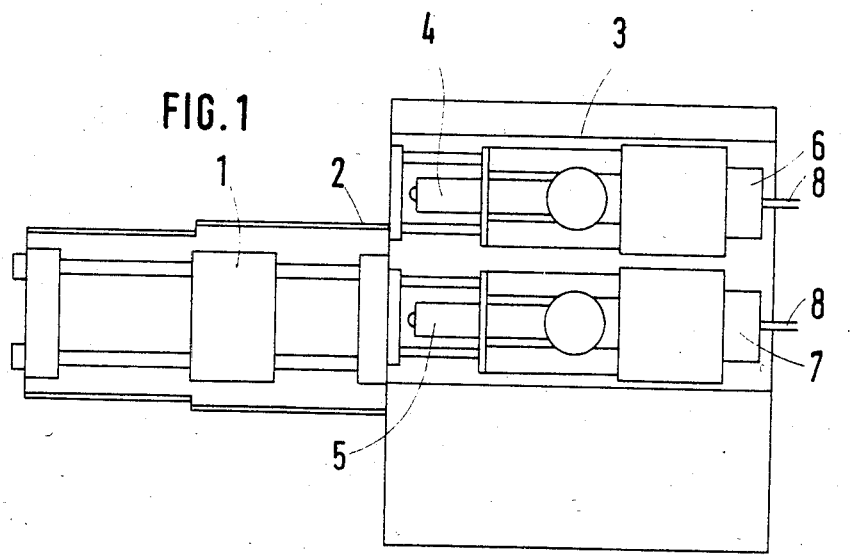
Figure 2:
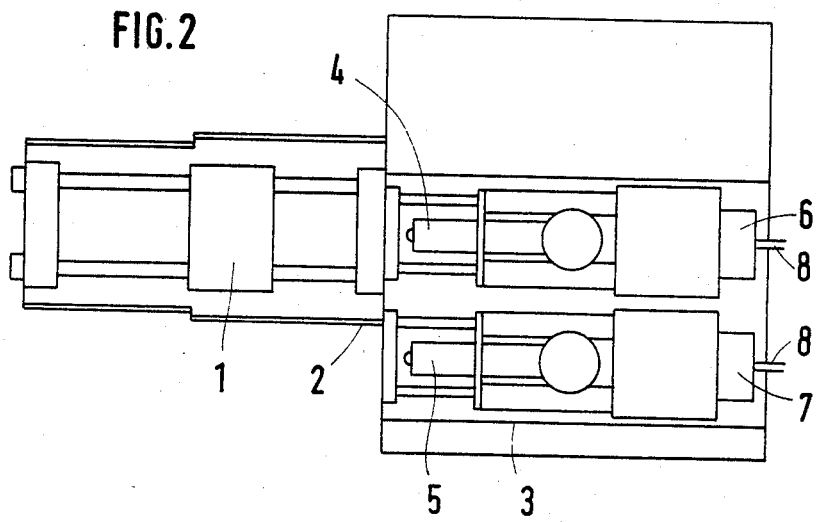

A better understanding of the present invention as well as other objects and advantages thereof will become apparent upon consideration of the detailed disclosure thereof, especially when taken with the accompanying drawing, wherein:

FIG. 1 is a plan view of the injection molding assembly of the present invention; and FIG. 2 is a plan view thereof with the extruder units in an exchanged position.

DETAILED DESCRIPTION OF THE INVENTION

Referring now to FIGS. 1 and 2, there is illustrated an injection molding assembly of the present invention comprised of a tool unit 1 mounted on a machine base member 2. A frame member 3 is disposed flushed with the machine base member 2, and is provided with extruder units 4 and 5 parallely- and spatially-disposed to one another. The frame 3 is mounted on track or guide means (not shown) and is provided with drive means (not shown) to permit transverse movement thereof on such track or guide means with respect to the machine frame 1.

The extruder units 4 and 5 are provided with drive means 6 and 7, respectively, and as illustrated in FIGS. 1 and 2, are of the hydraulic type. The hydraulic drive means 6 and 7 are in fluid communication by lines 8 with a hydraulic pump (not shown), suitably disposed, for example on the frame 3. The lines 8 are provided with switching means (not shown), for example magnetic valves, which permit high drive efficiency when either of the extruder units 4 or 5 is operatively associated with the tool unit 1.

As hereinbefore mentioned, when either extruder unit 4 or 5 is not operatively connected to the tool unit 1, the lines 8 of the stand-by extruder unit 5 may be placed in fluid communication with a low capacity hydraulic pump or may be shunted at low capacity to the hydraulic pump in fluid communication by lines 8 with the hydraulic unit of the extruder unit 4 operatively connected to the tool unit 1 referring particularly to FIG. 1.

Each extruder unit 4 and 5 is provided with electrical supply lines (not shown) including a heating element (not shown) to preheat within preselect temperature levels the extruder unit to be substituted or exchanged for the extruder unit operatively associated with the tool unit 1. Each extruder unit 4 and 5 is provided with a control panel (not shown) for effecting operation of the respective extruder units and may be mounted on the free side face of each extruder unit 4 and 5.

In FIGS. 1 and 2, the extruder units 4 and 5 are illustrated as being of like size, however, it is understood to one skilled in the art that the extruder units 4 and 5 may be of different design and feed screw configuration. Referring to FIG. 1, the extruder unit 5 is operatively connected to the tool unit 1 with the extruder unit 4, which is freely accessible, being in a cleaning mode and prepared for exchange or substitution for the extruder unit 5 without interfering with the operation of the extruder unit 5. Included in the preparation of the extruder unit 4 is the heating thereof to almost injection temperatures. It is understood that each extruder unit 4 and 5 may process like or dissimilar thermoplastic material compositions depending on production requirements.

At a preselected time, e.g. at a point in production of a required member of molded parts, the drive means of the frame member 3 is energized to move the frame member 3 transverse to the machine base member 2 whereby the extruder unit 5 is moved away from the tool unit 1 and the extruder unit 4 is positioned for operative association with the tool unit 1 referring now to FIG. 2. Upon reaching the position of the extruder units 4 and 5 illustrated in FIG. 2, the switching means disposed in the hydraulic lines 8 are operated to place the hydraulic lines 8 of the extruder unit 4 in fluid communication at full capacity with the hydraulic pump (not shown). Simultaneously, other process requirements are switched over to the extruder unit 4, e.g. electrical supply lines to place the extruder unit 4 in an operational mode for full production capability to manufacture molded parts.

After exchange of the extruder unit 4 for the extruder unit 5, the extruder unit 5 may be cleaned at reduced temperature levels and at reduced rotational speeds of the feed screw for removal of the previously processed thermoplastic composition. Again, the cleaning operation of the extruder unit 5 is effected without interference to the on-stream operation of the extruder unit 4.

Numerous modifications and variations of the invention are possible in light of the above teachings and therefore, the invention may be practiced otherwise than as particularly claimed.

What is claimed:

1. An injection molding assembly, which comprises: a tool unit; and
two extruder units mounted on a frame member, each of said extruder units including drive means and capable of being operatively connected to said tool unit, said extruder units being spatially-disposed from one another on said frame member, said frame member positioned for transverse movement with respect to said tool unit whereby when one of said extruder units is operatively connected to said tool unit, said other of said extruder units is not operatively connected to said tool unit.

2. The injection molding assembly as defined in claim 1 wherein each of said extruder units are provided with supply lines stationarily mounted thereto.

3. The injection molding assembly as defined in claim 2 wherein said drive means are hydraulically operated and are connected in fluid communication by said supply lines to a hydraulic pump.

4. The injection molding assembly as defined in claim 3 wherein said extruder unit not operatively connected to said tool unit is in fluid communication at low capacity with said hydraulic pump.

5. The injection molding assembly as defined in claim 1 wherein said frame member is disposed in flushed relationship to a base member on which is mounted said tool unit.

6. The injection molding assembly as defined in claim 1 and further including switching means for effecting transverse movement of said extruder units.

7. The injection molding assembly as defined in claim 6 wherein said switching means are manually operative.

8. The injection molding assembly as defined in claim 6 wherein said switching means are actuated by switches disposed in the path of movement of said extruder units.

* * * * *